United States Patent
Ramakrishnan et al.

(10) Patent No.: US 9,200,160 B2
(45) Date of Patent: Dec. 1, 2015

(54) SILYLATED POLYURETHANE/POLYORGANOSILOXANE BLEND AND SEALANT COMPOSITION AND FUMED SILICA COMPOSITION CONTAINING SAME

(75) Inventors: Indumathi Ramakrishnan, Bangalore (IN); Shayne Joseph Landon, Ballston Lake, NY (US); David A. Williams, Gansevoort, NY (US); Anantharaman Dhanabalan, Bangalore (IN)

(73) Assignee: Momentive Performance Materials Inc., Waterford, NY (US)

( * ) Notice: Subject to any disclaimer, the term of this patent is extended or adjusted under 35 U.S.C. 154(b) by 1163 days.

(21) Appl. No.: 12/748,810

(22) Filed: Mar. 29, 2010

(65) Prior Publication Data

US 2011/0237734 A1     Sep. 29, 2011

(51) Int. Cl.
| | | |
|---|---|---|
| C08L 75/04 | (2006.01) | |
| C08L 83/04 | (2006.01) | |
| C08L 83/06 | (2006.01) | |
| C08G 18/83 | (2006.01) | |
| C08G 77/18 | (2006.01) | |
| C08G 77/16 | (2006.01) | |

(52) U.S. Cl.
CPC ............. C08L 83/04 (2013.01); C08L 75/04 (2013.01); C08L 83/06 (2013.01); C08G 18/837 (2013.01); C08G 77/16 (2013.01); C08G 77/18 (2013.01); C08G 2190/00 (2013.01)

(58) Field of Classification Search
CPC ......... C08L 75/04; C08L 83/04; C08L 83/06; C08G 77/16; C08G 77/18; C08G 18/837
USPC ................... 524/492, 493, 500, 453
See application file for complete search history.

(56) References Cited

U.S. PATENT DOCUMENTS

| | | | |
|---|---|---|---|
| 3,627,722 A | 12/1971 | Seiter | |
| 3,632,557 A | 1/1972 | Brode | |
| 3,786,081 A | 1/1974 | Oppenlaender | |
| 3,829,505 A | 8/1974 | Herold | |
| 3,941,849 A | 3/1976 | Herold | |
| 3,971,751 A | 7/1976 | Isayama | |
| 4,242,490 A | 12/1980 | Emerson | |
| 4,335,188 A | 6/1982 | Igi | |
| 4,345,053 A | 8/1982 | Rizk | |
| 4,481,367 A | 11/1984 | Knopf | |
| 4,625,012 A | 11/1986 | Rizk | |
| 4,687,851 A | 8/1987 | Laughner | |
| 4,985,491 A | 1/1991 | Reisch | |
| 5,096,993 A | 3/1992 | Smith | |
| 5,100,997 A | 3/1992 | Reisch | |
| 5,106,874 A | 4/1992 | Porter | |
| 5,116,931 A | 5/1992 | Reisch | |
| 5,136,010 A | 8/1992 | Reisch | |
| 5,185,420 A | 2/1993 | Smith | |
| 5,266,681 A | 11/1993 | Reisch | |
| 5,623,044 A | 4/1997 | Chiao | |
| 5,852,137 A | 12/1998 | Hsieh | |
| 5,908,808 A | 6/1999 | Hanada | |
| 5,919,888 A | 7/1999 | Lawrey | |
| 5,990,257 A | 11/1999 | Johnston | |
| 6,197,912 B1 | 3/2001 | Huang | |
| 6,207,783 B1 | 3/2001 | Petty | |
| 6,207,794 B1 | 3/2001 | Yamasaki | |
| 6,303,731 B1 | 10/2001 | Carlson | |
| 6,310,170 B1 | 10/2001 | Johnston | |
| 6,359,101 B1 | 3/2002 | O'Connor | |
| 6,515,164 B1 | 2/2003 | Bolte | |
| 6,545,104 B1 | 4/2003 | Mueller | |
| 6,602,964 B2 * | 8/2003 | Huang et al. ........ | 525/477 |
| 6,833,423 B2 | 12/2004 | Roesler | |
| 2002/0198352 A1 | 12/2002 | Tanaka | |
| 2004/0122253 A1 | 6/2004 | Smith | |

(Continued)

FOREIGN PATENT DOCUMENTS

| | | |
|---|---|---|
| EP | 1 506 266 B1 | 7/2006 |
| GB | 1 532 971 | 11/1978 |

(Continued)

OTHER PUBLICATIONS

US 7,342,069, 03/2008, Beers et al. (withdrawn)

*Primary Examiner* — Ling Choi
*Assistant Examiner* — David L Miller
(74) *Attorney, Agent, or Firm* — Dominick G. Vicari

(57) ABSTRACT

There is provided herein a composition comprising: (A) a silanol and/or hydrocarbon-terminated polyorganosiloxane in an amount of from about 30 weight percent to about 90 weight percent; and, (B) a moisture curable silylated polyurethane resin in an amount of from about 10 weight percent to about 70 weight percent. There is also provided herein in another embodiment a two part sealant composition wherein the first part comprises: (A) a silanol and/or hydrocarbon-terminated polyorganosiloxane in an amount of from about 15 weight percent to about 60 weight percent, (B) a moisture curable silylated polyurethane resin in an amount of from about 2 weight percent to about 32 weight percent, and (C) a filler, said weight percents being based on the weight of the first part. In addition, there is provided herein a fumed silica composition comprising: (A) a silanol and/or hydrocarbon-terminated polyorganosiloxane in an amount of from about 20 weight percent to about 62 weight percent; (B) a moisture curable silylated polyurethane resin in an amount of from about 8 weight percent to about 38 weight percent; and, (C) a treated fumed silica in an amount of from about 5 to about 10 weight percent.

17 Claims, 16 Drawing Sheets

(56) References Cited

U.S. PATENT DOCUMENTS

Figure 1:
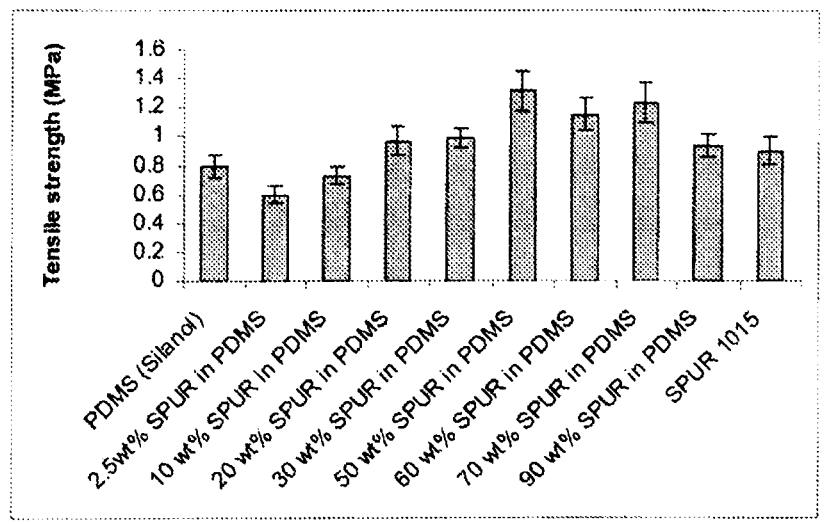

| | | |
|---|---|---|
| 2005/0020706 A1 | 1/2005 | Kollbach |
| 2006/0270770 A1* | 11/2006 | Feng et al. .................. 524/268 |
| 2007/0129528 A1* | 6/2007 | Huang et al. ................ 528/78 |
| 2007/0160781 A1 | 7/2007 | Landon et al. |
| 2007/0173596 A1 | 7/2007 | Landon et al. |
| 2007/0173597 A1 | 7/2007 | Williams |
| 2008/0312369 A1* | 12/2008 | Beers et al. .................. 524/425 |
| 2009/0005498 A1 | 1/2009 | Lin et al. |
| 2009/0018260 A1* | 1/2009 | Correia et al. ............... 524/588 |

FOREIGN PATENT DOCUMENTS

| | | |
|---|---|---|
| WO | 2009088472 A1 | 7/2009 |
| WO | 2009088474 A1 | 7/2009 |

* cited by examiner

SILYLATED POLYURETHANE/POLYORGANOSILOXANE BLEND AND SEALANT COMPOSITION AND FUMED SILICA COMPOSITION CONTAINING SAME

FIELD OF THE INVENTION

The present invention is directed to a blend of silylated polyurethane and polyorganosiloxane, specifically silanol/hydrocarbon terminated polyorganosiloxane, and to a sealant composition and a fumed silica composition containing the same.

BACKGROUND OF THE INVENTION

The use of polyorganosiloxanes in sealant compositions brings in many advantages like high temperature stability, UV resistance, oxidation resistance etc, but such sealant compositions suffer from very high gas permeability which make them less attractive. The gas permeability of polyorganosiloxane based sealants can potentially be reduced with the addition of inorganic fillers, achieving a balanced performance of reduced gas permeability with retention of processibility (viscosity control of the resultant composition). But maintaining suitable mechanical properties in such filled compositions still remains a challenging task.

SUMMARY OF THE INVENTION

There is provided herein in one embodiment a composition comprising:
(A) a silanol and/or hydrocarbon-terminated polyorganosiloxane in an amount of from about 30 weight percent to about 90 weight percent; and,
(B) a moisture curable silylated polyurethane resin in an amount of from about 10 weight percent to about 70 weight percent.

There is also provided herein in another embodiment a two part sealant composition wherein the first part comprises:
(A) a silanol and/or hydrocarbon-terminated polyorganosiloxane in an amount of from
about 15 weight percent to about 60 weight percent,
(B) a moisture curable silylated polyurethane resin in an amount of from about 2 weight percent to about 32 weight percent, and
(C) a filler, said weight percents being based on the weight of the first part.

In addition, there is provided herein a fumed silica composition comprising:
(A) a silanol and/or hydrocarbon-terminated polyorganosiloxane in an amount of from
about 20 weight percent to about 62 weight percent;
(B) a moisture curable silylated polyurethane resin in an amount of from about 8 weight percent to about 38 weight percent; and,
(C) a treated fumed silica in an amount of from about 5 to about 10 weight percent.

DETAILED DESCRIPTION OF THE INVENTION

The inventors have unexpectedly discovered herein that there is a significant reduction in the gas permeability of moisture cured polyorganosiloxane, e.g., moisture cured polydimethylsiloxane (PDMS), with the addition of moisture curable silylated polyurethane resin (SPUR). Since the SPUR is also moisture curable, similar to moisture curable polyorganosiloxane (e.g., silanol and/or hydrocarbon-terminated polyorganosiloxane, such as silanol and/or hydrocarbon terminated polydimethylsiloxane) it can potentially be inter cross-linked with moisture curable PDMS during moisture cure of the resultant blend, thereby form a stable network. Moreover, the elastomeric nature of moisture-cured domains of SPUR helps to retain or improve the mechanical properties of moisture cured PDMS.

More specifically, the inventors have unexpectedly discovered a synergistic reduction in gas permeability, e.g., oxygen permeability (although other gases such as argon are contemplated), while maintaining favorable mechanical properties by the use of specific formulations of silanol and/or hydrocarbon-terminated polyorganosiloxane and SPUR, most specifically wherein the amount of silanol and/or hydrocarbon-terminated polyorganosiloxane and SPUR are present in approximately equal amounts in the sealant compositions and fumed silica compositions described herein.

When a minor amount of SPUR is used, i.e., when the loading of SPUR is less than the loading of silanol and/or hydrocarbon-terminated polyorganosiloxane, the SPUR exists as a domain phase in a continuous phase of silanol and/or hydrocarbon-terminated polyorganosiloxane. As the loading level of SPUR approaches the loading level of silanol and/or hydrocarbon-terminated polyorganosiloxane, a synergistic effect in gas permeability (e.g., oxygen permeability) and mechanical properties are observed, as compared to the separate gas permeability and mechanical properties of using silanol and/or hydrocarbon-terminated polyorganosiloxane sealant compositions.

While not wishing to be bound by theory, it is believed as the loading level of SPUR approaches and meets that of the loading level of silanol and/or hydrocarbon-terminated polyorganosiloxane that there is a phase inversion and the SPUR becomes the continuous phase and the silanol and/or hydrocarbon-terminated polyorganosiloxane becomes the domain phase.

This synergistic effect is surprising in that it is known that SPUR sealants typically have a higher modulus and tensile strength as well as better paintability as compared to sitanol and/or hydrocarbon-terminated polyorganosiloxane sealants, and that adding increasing amounts of silanol and/or hydrocarbon-terminated polyorganosiloxane to greater amounts of SPUR sealants actually reduces these desirable properties.

Further, silanol and/or hydrocarbon-terminated polyorganosiloxane sealants are known to have lower water vapor transmission properties than SPUR sealants. Surprisingly, the inventors herein have discovered that despite the known desirable lower water vapor transmission properties of silanol and/or hydrocarbon-terminated polyorganosiloxane sealants, as the loading level of SPUR approaches and meets the loading level of silanol and/or hydrocarbon-terminated polyorganosiloxane, the above-described phase inversion occurs resulting in unexpectedly favorable gas permeability and mechanical properties of the sealant composition, without significantly reducing the favorable water vapor transmission properties of silanol and/or hydrocarbon-terminated polyorganosiloxane sealants.

The sealant compositions and fumed silica compositions, as well as the composition described herein, have widespread use in insulation, e.g., insulation in insulated glass units, structural glazing, and in insulating various architectural elements.

It will be understood herein that all range end-points, e.g., weight percent range end-points recited herein, can be used interchangeably in any combination of such endpoints to construct further ranges than those which are expressly recited herein. Further such use will have no limitation on the use of a lower endpoint in one recited range being used as the upper endpoint in a newly constructed range, and likewise, the upper endpoint in one recited range being used as the lower endpoint in a newly constructed range. Further, all ranges recited herein may comprise all sub-ranges there between. Still further, all range endpoints which are expressly recited herein for any one of the components of the herein recited composition, sealant composition, or fumed silica composition, e.g., the range end-points for the silanol and/or hydrocarbon-terminated polyorganosiloxane and the silylated polyurethane resin, can be used interchangeably, as a newly constructed endpoint as described above, for any of the same components in any of the other aforementioned compositions.

In one embodiment herein the silanol and/or hydrocarbon-terminated polyorganosiloxane (A) is a silanol and/or hydrocarbon-terminated polydiorganosiloxane, preferably wherein the silanol and/or hydrocarbon-terminated polyorganosiloxane (A) is a silanol and/or hydrocarbon-terminated polydiorganosiloxane wherein the organo moieties are each independently an alkyl group of from 1 to about 6 carbon atoms, e.g., methyl, or an aryl group of from 6 to 18 carbon atoms, e.g. phenyl.

In one embodiment, the silanol and/or hydrocarbon-terminated polydiorganosiloxane (A) herein is advantageously selected from amongst those of the general formula:

$M_a D_b D'_c$.

with the subscript a=2 and b equal to or greater than 1 and with the subscript c zero or positive where
$M=(HO)_{3-x-y}R^{15}_x R^{16}_y SiO_{1/2}$; with the subscript x=0, 1 or 2 and the subscript y is either 0 or 1, subject to the limitation that x+y is less than or equal to 3, or in one embodiment, less than or equal to 2, where $R^{15}$ and $R^{16}$ are independently chosen monovalent $C_1$ to $C_{60}$ hydrocarbon radicals, optionally containing a heteroatom, preferably from 1 to 12 carbon atom hydrocarbon radicals, more preferably from 1 to 6 carbon atoms, preferably at least one of $R^{15}$ and $R^{18}$ are independently an alkyl radical of from 1 to about 20 carbon atoms, preferably from 1 to about 12 carbon atoms; where $D=R^{17}R^{18}SiO_{2/2}$; where $R^{17}$ and $R^{18}$ are independently chosen monovalent $C_1$ to $C_{60}$ hydrocarbon radicals, preferably from 1 to 12 carbon atom hydrocarbon radicals, more preferably from 1 to 6 carbon atoms; where $D'=R^{19}R^{20}SiO_{2/2}$; where $R^{19}$ and $R^{20}$ are independently chosen monovalent hydrocarbon radicals of up to about 60 carbon atoms, preferably from 1 to 12 carbon atom hydrocarbon radicals, more preferably from 1 to 6 carbon atoms. In one embodiment herein the hydrocarbon radicals described herein can comprise alkyl, alkoxy, alkenyl, and aryl radicals of up to about 20 carbon atoms, preferably up to about 12 carbon atoms.

The foregoing silanol-terminated polydiorganosiloxane (A) is disclosed in further detail in published U.S. Patent Application 2005/0192387, the entire contents of which are incorporated by reference herein.

Moisture curable silylated polyurethane resin (SPUR) which can be employed in the compositions herein are known materials and in general can be obtained by (a) reacting an isocyanate-terminated polyurethane (PUR) prepolymer with a suitable silane, e.g., one possessing both hydrolyzable functionality, specifically, one to three alkoxy groups for each silicon atom, and active hydrogen functionality, e.g., mercapto, primary amine and, advantageously, secondary amine, which is reactive for isocyanate, or by (b) reacting a hydroxyl-terminated PUR prepolymer with a suitable isocyanate-terminated silane, e.g., one possessing one to three alkoxy groups. The details of these reactions, and those for preparing the isocyanate-terminated and hydroxyl-terminated PUR prepolymers employed therein can be found in, amongst others: U.S. Pat. Nos. 4,985,491, 5,919,888, 6,197,912, 6,207,794, 6,303,731, 6,359,101 and 6,515,164 and published U.S. Patent Application Nos. 2004/0122253 and 2005/0020706 (isocyanate-terminated PUR prepolymers); U.S. Pat. Nos. 3,786,081 and 4,481,367 (hydroxyl-terminated PUR prepolymers); U.S. Pat. Nos. 3,627,722, 3,632,557, 3,971,751, 5,623,044, 5,852,137, 6,197,912, 6,207,783 and 6,310,170 (moisture-curable SPUR resin obtained from reaction of isocyanate-terminated PUR prepolymer and reactive silane, e.g., aminoalkoxysilane); and, U.S. Pat. Nos. 4,345,053, 4,625, 012, 6,833,423 and published U.S. Patent Application 2002/0198352 (moisture-curable SPUR resin obtained from reaction of hydroxyl-terminated PUR prepolymer and isocyanatosilane). The entire contents of each of the foregoing U.S. patent documents are each incorporated by reference herein in their entireties.

(a) Moisture-Curable SPUR Resin Obtained From Isocyanate-terminated PUR Prepolymer In one embodiment herein the moisture-curable SPUR resin can be any of the SPURs described in U.S. Pat. No. 5,990,257 and can be made by any of the methods described therein, the entire contents of which are incorporated herein by reference in their entirety.

The isocyanate-terminated PUR prepolymers are obtained by reacting one or more polyols, advantageously, diols, with one or more polyisocyanates, advantageously, diisocyanates, in such proportions that the resulting prepolymers will be terminated with isocyanate. In the case of reacting a diol with a diisocyanate, a molar excess of diisocyanate will be employed.

Included among the polyols that can be utilized for the preparation of the isocyanate-terminated PUR prepolymer are polyether polyols, polyester polyols such as the hydroxyl-terminated polycaprolactones, polyetherester polyols such as those obtained from the reaction of polyether polyol with e-caprolactone, polyesterether polyols such as those obtained from the reaction of hydroxyl-terminated polycaprolactones with one or more alkylene oxides such as ethylene oxide and propylene oxide, hydroxyl-terminated polybutadienes, and the like.

Specific suitable polyols that can be utilized for the preparation of the isocyanate-terminated PUR prepolymer include the poly(oxyalkylene)ether diols (i.e., polyether diols), in particular, the poly(oxyethylene)ether diols, the poly(oxypropylene)ether diols and the poly(oxyethylene-oxypropylene)ether diols, poly(oxyalkylene)ether triols, poly(tetramethylene)ether glycols, polyacetals, polyhydroxy polyacrylates, polyhydroxy polyester amides, polyhydroxy polythioethers, polycaprolactone diols and triols, and the like. In one embodiment of the present invention, the polyols used in the production of the isocyanate-terminated PUR prepolymers are poly(oxyethylene)ether diols with equivalent weights between about 500 and 25,000. In another embodiment of the present invention, the polyols used in the production of the isocyanate-terminated PUR prepolymers are poly(oxypropylene)ether diols with equivalent weights between about 1,000 to 20,000. Mixtures of polyols of various structures, molecular weights and/or functionalities can also be used.

The polyether polyols can have a functionality up to about 8 but advantageously have a functionality of from 2 to 4 and more advantageously, a functionality of 2 (i.e., diols). Especially suitable are the polyether polyols prepared in the presence of double-metal cyanide (DMC) catalysts, an alkaline metal hydroxide catalyst, or an alkaline metal alkoxide catalyst; see, for example, U.S. Pat. Nos. 3,829,505, 3,941,849, 4,242,490, 4,335,188, 4,687,851, 4,985,491, 5,096,993, 5,100,997, 5,106,874, 5,116,931, 5,136,010, 5,185,420 and 5,266,681, the entire contents of each of the foregoing patents are incorporated herein by reference in their entireties. Polyether polyols produced in the presence of such catalysts tend to have high molecular weights and low levels of unsaturation, properties of which, it is believed, are responsible for the improved performance of inventive retroreflective articles. The polyether polyols preferably have a number average molecular weight of from about 1,000 to about 25,000, more preferably from about 2,000 to about 20,000, and even more preferably from about 4,000 to about 18,000. Examples of commercially available diols that are suitable for making the isocyanate-terminated PUR prepolymer include ARCOL R-1819 (number average molecular weight of 8,000), E-2204 (number average molecular weight of 4,000), and ARCOL E-2211 (number average molecular weight of 11,000).

Any of numerous polyisocyanates, advantageously, diisocyanates, and mixtures thereof, can be used to provide the isocyanate-terminated PUR prepolymers. In one embodiment, the polyisocyanate can be diphenylmethane diisocyanate ("MDI"), polymethylene polyphenylisocyanate ("PMDI"), paraphenylene diisocyanate, naphthylene diisocyanate, liquid carbodiimide-modified MDI and derivatives thereof, isophorone diisocyanate, dicyclohexylmethane-4,4'-diisocyanate, toluene diisocyanate ("TDI"), particularly the 2,6-TDI isomer, as well as various other aliphatic and aromatic polyisocyanates that are well-established in the art, and combinations thereof.

Silylation reactants for reaction with the isocyanate-terminated PUR prepolymers described above must contain functionality that is reactive with isocyanate and at least one readily hydrolyzable and subsequently crosslinkable group, e.g., alkoxy. Particularly useful silylation reactants are the silanes of the general formula:

wherein X is an active hydrogen-containing group that is reactive for isocyanate, e.g., —SH or —NHR$^4$ in which R$^4$ is H, a monovalent hydrocarbon group of up to 8 carbon atoms or —R$^5$—Si(R$^6$)$_y$(OR$^7$)$_{3-y}$, R$^1$ and R$^5$ each is the same or different divalent hydrocarbon group of up to 12 carbon atoms, optionally containing one or more heteroatoms, each R$^2$ and R$^6$ is the same or different monovalent hydrocarbon group of up to 8 carbon atoms, each R$^3$ and R$^7$ is the same or different alkyl group of up to 6 carbon atoms and x and y each, independently, is 0, 1 or 2.

Specific silanes for use herein include the mercaptosilanes 2-mercaptoethyl trimethoxysilane, 3-mercaptopropyl trimethoxysilane, 2-mercaptopropyl triethoxysilane, 3-mercaptopropyl triethoxysilane, 2-mercaptoethyl tripropoxysilane, 2-mercaptoethyl tri sec-butoxysilane, 3-mercaptopropyl tri-t-butoxysilane, 3-mercaptopropyl triisopropoxysilane, 3-mercaptopropyl trioctoxysilane, 2-mercaptoethyl tri-2'-ethylhexoxysilane, 2-mercaptoethyl dimethoxy ethoxysilane, 3-mercaptopropyl methoxyethoxypropoxysilane, 3-mercaptopropyl dimethoxy methylsilane, 3-mercaptopropyl methoxy dimethylsilane, 3-mercaptopropyl ethoxy dimethylsilane, 3-mercaptopropyl diethoxy methylsilane, 3-mercaptopropyl cyclohexoxy dimethyl silane, 4-mercaptobutyl trimethoxysilane, 3-mercapto-3-methylpropyltrimethoxysilane, 3-mercapto-3-methylpropyl-tripropoxysilane, 3-mercapto-3-ethylpropyl-dimethoxy methylsilane, 3-mercapto-2-methylpropyl trimethoxysilane, 3-mercapto-2-methylpropyl dimethoxyphenylsilane, 3-mercaptocyclohexyl-trimethoxysilane, 12-mercaptododecyl trimethoxy silane, 12-mercaptododecyl-triethoxy silane, 18-mercaptooctadecyl trimethoxysilane, 18-mercaptooctadecyl methoxydimethylsilane, 2-mercapto-2-methylethyl-tripropoxysilane, 2-mercapto-2-methylethyl-trioctoxysilane, 2-mercaptophenyl trimethoxysilane, 2-mercaptophenyl triethoxysilane, 2-mercaptotolyl trimethoxysilane, 2-mercaptotolyl triethoxysilane, 1-mercaptomethyltolyl trimethoxysilane, 1-mercaptomethyltolyl triethoxysilane, 2-mercaptoethylphenyl trimethoxysilane, 2-mercaptoethyiphenyl triethoxysilane, 2-mercaptoethyltolyl trimethoxysilane, 2-mercaptoethyltolyl triethoxysilane, 3-mercaptopropylphenyl trimethoxysilane and, 3-mercaptopropylphenyl triethoxysilane, and the aminosilanes 3-aminopropyltrimethoxysilane, 3-aminopropyltriethoxysilane, 4-aminobutyltriethoxysilane, N-methyl-3-amino-2-methylpropyltrimethoxysilane, N-ethyl-3-amino-2-methylpropyltrimethoxysilane, N-ethyl-3-amino-2-methylpropyldiethoxymethylsilane, N-ethyl-3-amino-2-methylpropyltriethoxysilane, N-ethyl-3-amino-2-methylpropylmethyldimethoxysilane, N-butyl-3-amino-2-methylpropyltrimethoxysilane, 3-(N-methyl-2-amino-1-methyl-1-ethoxy)-propyltrimethoxysilane, N-ethyl-4-amino-3,3-dimethyl-butyldimethoxymethylsilane, N-ethyl-4-amino-3,3-dimethylbutyltrimethoxy-silane, N-(cyctohexyl)-3-aminopropyltrimethoxysilane, N-(2-aminoethyl)-3-aminopropyitrimethoxysilane, N-(2-aminoethyl)-3-aminopropyltriethoxy-silane, N-(2-aminoethyl)-3-aminopropylmethyldimethoxysilane, aminopropyltriethoxysilane, bis-(3-trimethoxysilyl-2-methylpropyl)amine and N-(3'-trimethoxysilylpropyl)-3-amino-2-methylpropyltrimethoxysilane.

A catalyst will ordinarily be used in the preparation of the isocyanate-terminated PUR prepolymers. Advantageously, condensation catalysts are employed since these will also catalyze the cure (hydrolysis followed by crosslinking) of the SPUR resin component of the sealant composition and fumed silica compositions of the invention. Suitable condensation catalysts include the dialkyltin dicarboxylates such as dibutyltin dilaurate and dibutyltin acetate, tertiary amines, the stannous salts of carboxylic acids, such as stannous octoate and stannous acetate, and the like. In one embodiment of the present invention, dibutyltin dilaurate catalyst is used in the production of the PUR prepolymer. Other useful catalysts include zirconium-containing and bismuth-containing complexes such as KAT XC6212, K-KAT XC-A209 and K-KAT 348, supplied by King Industries, Inc., aluminum chelates such as the TYZER® types, available from DuPont company, and the KR types, available from Kenrich Petrochemical, Inc., and other organometallic catalysts, e.g., those containing a metal such as Zn, Co, Ni, Fe, and the like.

(b) Moisture-Curable SPUR Resins Obtained from Hydroxyl-Terminated PUR Prepolymers The moisture-curable SPUR resin of the first part of the curable composition of the invention can, as previously indicated, be prepared by reacting a hydroxyl-terminated PUR prepolymer with an isocyanatosilane. The hydroxyl-terminated PUR prepolymer can be obtained in substantially the same manner employing substantially the same materials, i.e., polyols, polyisocyanates and optional catalysts (preferably condensation catalysts), described above for the preparation of isocyanate-terminated PUR prepolymers the one major difference being that the proportions of polyol and polyisocyanate will be such as to result in hydroxyl-termination in the resulting prepolymer. Thus, e.g., in the case of a diol and a diisocyanate, a molar excess of the former will be used thereby resulting in hydroxyl-terminated PUR prepolymer.

Useful silylation reactants for the hydroxyl-terminated SPUR resins are those containing isocyanate termination and readily hydrolyzable functionality, e.g., 1 to 3 alkoxy groups. Suitable silylating reactants are the isocyanatosilanes of the general formula:

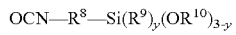
$$OCN-R^8-Si(R^9)_y(OR^{10})_{3-y}$$

wherein $R^8$ is an alkylene group of up to 12 carbon atoms, optionally containing one or more heteroatoms, each $R^9$ is the same or different alkyl or aryl group of up to 8 carbon atoms, each $R^{10}$ is the same or different alkyl group of up to 6 carbon atoms and y is 0, 1 or 2. In one embodiment, $R^8$ possesses 1 to 4 carbon atoms, each $R^{10}$ is the same or different methyl, ethyl, propyl or isopropyl group and y is 0.

Specific isocyanatosilanes that can be used herein to react with the foregoing hydroxyl-terminated PUR prepolymers to provide moisture-curable SPUR resins include isocyanatopropyltrimethoxysilane, isocyanatoisopropyl trimethoxysilane, isocyanato-n-butyltrimethoxysilane, isocyanato-t-butyltrimethoxysilane, isocyanatopropyltriethoxysilane, isocyanatoisopropyltriethoxysilane, isocyanato-n-butyltriethoxysilane, isocyanato-t-butyltriethoxysilane, and the like.

In another embodiment, the composition described herein is such that the silanol and/or hydrocarbon-terminated polyorganosiloxane (A) is present in an amount of from about 40 weight percent to about 80 weight percent; and the silylated polyurethane resin (B) is present in an amount of from about 20 to about 60 weight percent.

In one other embodiment, the composition described herein is such that the silanol and/or hydrocarbon-terminated polyorganosiloxane (A) is present in an amount of from about 45 weight percent to about 70 weight percent; and the silylated polyurethane resin (B) is present in an amount of from about 30 to about 55 weight percent.

In yet another embodiment, the composition described herein is such that the silanol and/or hydrocarbon-terminated polyorganosiloxane (A) is present in an amount of from about 45 weight percent to about 60 weight percent; and the silylated polyurethane resin (B) is present in an amount of from about 40 to about 55 weight percent.

In yet even another embodiment, the composition described herein is such that the silanol and/or hydrocarbon-terminated polyorganosiloxane (A) is present in an amount of from about 45 weight percent to about 55 weight percent; and the silylated polyurethane resin (B) is present in an amount of from about 45 to about 55 weight percent.

As described above, it has been unexpectedly discovered that the composition described herein provides beneficial gas permeability values while also providing favorably mechanical properties when the silanol and/or hydrocarbon-terminated polyorganosiloxane (A) and the silylated polyurethane resin (B) are both present in an amount of about 50 weight percent, i.e., in about equal amounts.

As alternative combinations of amounts of silanol and/or hydrocarbon-terminated polyorganosiloxane (A) and the silylated polyurethane resin (B) in the composition described herein such components can have ranges of weight percent as described in table A below:

TABLE A

| Silanol and/or hydrocarbon-terminated polyorganosiloxane (A) | silylated polyurethane resin (B) |
|---|---|
| 4-96 | 4-58 |
| 45-95 | 5-55 |
| 47-90 | 10-53 |
| 10-60 | 40-90 |
| 15-55 | 45-85 |
| 20-52 | 48-80 |

In addition to the above ranges for component (A) in the composition described herein, the amount of component (A) can have a lower end point of any of 11, 12, 15, 18, 20, 31, 32, 35, 41, 42, 43, 46, 47, 48 and 49, with any of an upper end point of 97, 95, 93, 89, 88, 85, 79, 78, 75, 69, 68, 65, 59, 58, 57, 56, 54, 53, 52, and 51.

In addition to the above ranges for component (B) in the composition described herein, the amount of component (B) can have a lower end point of 3, 4, 5, 7, 11, 12, 15, 21, 22, 25, 31, 32, 33, 35, 41, 42, 46, 47, 48 and 49, with any of an upper end point of 89, 88, 85, 80, 75, 69, 68, 65, 59, 58, 54, 53, 52 and 51.

Each of the composition, the sealant composition and the fumed silica composition described herein can have their respective components separated into two parts, i.e., as a two part composition which when combined can then form a one component composition. With regard to the sealant composition and the fumed silica composition the separation of the particular components in such compositions can be done in a manner known in the art to avoid premature cure, wherein the separated parts of the composition are stored in the absence of moisture, e.g., in the absence of atmospheric moisture.

Typically with regard to the sealant composition the composition can be separated into a first part comprising components (A), (B) and (C), and into a second part comprising (D) an alkyl-terminated polysiloxane, e.g., an alkyl-terminated polydimethylsiloxane (with the understanding that if an alkyl-terminated polysiloxane is used as component (A) in the one part, the other part can comprise the same and/or different alkyl-terminated polysiloxane); (E) catalyst; (F) an adhesion promoter; (G) a crosslinker; and, optionally, (H) at least one additional component selected from the group consisting of at least one solid polymer having a permeability to gas that is less than the permeability of the crosslinked polyorganosiloxane, UV stabilizer, antioxidant, cure accelerator, thixotropic agent, plasticizer, moisture scavenger, pigment, dye, surfactant, and solvent.

The two part composition can comprise any combination of components (A)-(H) wherein any one or more of components (A)-(H) can be present in either one or both of the parts of the composition provided that components (A), (B) and (E) and/or the "cure accelerator" of component (H) are not present in one component simultaneously prior to the combination of both components.

The crosslinker component in the sealant composition is one which is effective for the crosslinking of silanol and/or hydrocarbon-terminated polyorganosiloxane. In one embodiment, the crosslinker is an alkylsilicate of the general formula:

$$(R^{11}O)(R^{12}O)(R^{13}O)(T^{14}O)Si$$

where $R^{11}$, $R^{12}$, $R^{13}$ and $R^{14}$ are independently chosen monovalent hydrocarbon radicals of up to about 60 carbon atoms.

Crosslinkers useful herein include tetra-N-propylsilicate (NPS), tetraethylorthosilicate, methytrimethoxysilane and similar alkyl substituted alkoxysilane compositions.

The at least one solid polymer having a permeability to gas that is less than the permeability of the crosslinked polyorganosiloxane includes polyethylenes such as low density polyethylene (LOPE), very low density polyethylene (VLDPE), linear low density polyethylene (LLDPE) and high density polyethylene (HDPE); polypropylene (PP), polyisobutylene (PIB), polyvinyl acetate (PVAc), polyvinyl alcohol (PVoH), polystyrene, polycarbonate, polyester, such as, polyethylene terephthalate (PET), polybutylene terephthalate (PBT), polyethylene napthalate (PEN), glycol-modified polyethylene terephthalate (PETG); polyvinylchloride (PVC), polyvinylidene chloride, polyvinylidene fluoride, thermoplastic polyurethane (TPU), acrylonitrile butadiene styrene (ABS), polymethylmethacrylate (PMMA), polyvinyl fluoride (PVF), Polyamides (nylons), polymethylpentene, polyimide (PI), polyetherimide (PEI), polether ether ketone (PEEK), polysulfone, polyether sulfone, ethylene chlorotrifluoroethylene, polytetrafluoroethylene (PTFE), cellulose acetate, cellulose acetate butyrate, plasticized polyvinyl chloride, ionomers (Surtyn), polyphenylene sulfide (PPS), styrene-maleic anhydride, modified polyphenylene oxide (PPO), and the like and mixture thereof.

The at least one solid polymer(s) can also be elastomeric in nature, examples include, but are not limited to ethylene-propylene rubber (EPDM), polybutadiene, polychloroprene, polyisoprene, polyurethane (TPU), styrene-butadiene-styrene (SBS), styrene-ethylene-butadiene-styrene (SEEBS), polymethylphenyl siloxane (PMPS), and the like.

These solid polymers can be blended either alone or in combinations or in the form of copolymers, e.g. polycarbonate-ABS blends, polycarbonate polyester blends, grafted polymers such as, silane grafted polyethylenes, and silane grafted polyurethanes.

In one embodiment of the present invention, the sealant composition and/or the fumed silica composition described herein contains a polymer selected from the group consisting of low-density polyethylene (LDPE), very low density polyethylene (VLDPE), linear low density polyethylene (LLDPE), high density polyethylene (HDPE), and mixtures thereof. In another embodiment of the invention, the sealant composition has a polymer selected from the group consisting of low-density polyethylene (LDPE), very low density polyethylene (VLDPE), linear low density polyethylene (LLDPE), and mixture thereof. In yet another embodiment of the present invention, the solid polymer is a linear low density polyethylene (LLDPE).

The sealant composition and/or the fumed silica composition described herein can contain one or more fillers. Suitable fillers for use herein include precipitated and colloidal calcium carbonates which have been treated with compounds such as stearic acid or stearate ester; reinforcing silicas such as fumed silicas, precipitated silicas, silica gels and hydrophobized silicas and silica gels; crushed and ground quartz, alumina, aluminum hydroxide, titanium hydroxide, diatomaceous earth, iron oxide, carbon black, graphite, mica, talc, organic nanoclays, such as the organic nanoclays described in U.S. Patent Application Publication Nos. 2007/0160781 and 2007/0173596, the contents of both of which are incorporated herein in their entirety, inorganic-organic nanocomposites, such as those described in U.S. Patent Application Publication No. 2007/0173597, the contents of which are incorporated herein in their entirety, and the like, and mixtures thereof.

The sealant composition can preferably contain calcium carbonate(s). The fumed silica composition described herein can preferably contains any one or more of the aforementioned fillers in addition to fumed silica.

The sealant composition and/or the fumed silica composition described herein can also include one or more alkoxysilanes as adhesion promoters. Useful adhesion promoters include N-2-aminoethyl-3-aminopropyltriethoxysilane, gamma-aminopropyltriethoxysilane, gamma-aminopropyltrimethoxysilane, aminopropyltrimethoxysilane, bis-gamma-trimethoxysilypropyl)amine, N-phenyl-gamma-aminopropyltrimethoxysilane, triaminofunctionaltrimethoxysilane, gamma.-aminopropylmethyldiethoxysilane, gamma-aminopropylmethyldiethoxysilane, methacryloxypropyltrimethoxysilane, methylaminopropyltrimethoxysilane, gamma-glycidoxypropylethyld imethoxysilane, gamma-glycidoxypropyltrimethoxysilane, gamma-glycidoxyethyltrimethoxysilane, beta.-(3,4-epoxycyclohexyl)propyltrimethoxysilane, beta.-(3,4-epoxycyclohexyl) ethylmethyldimethoxysilane, isocyanatopropyltriethoxysilane, isocyanatopropylmethyldimethoxysilane, beta-cyanoethyltrimethoxysilane, gamma-acryloxypropyltrimethoxysilane, gamma-methacryloxypropylmethyldimethoxysilane, 4-amino-3,3-dimethylbutyltrimethoxysilane, and N-ethyl-3-trimethoxysilyl-2-methylpropanamine, and the like. In one embodiment, the adhesion promoter can be a combination of n-2-aminoethyl-3-aminopropyltrimethoxysilane and 1,3,5-tris(trimethoxysilylpropyl)isocyanurate.

The sealant composition and/or the fumed silica composition of the present invention can also include one or more non-ionic surfactants such as polyethylene glycol, polypropylene glycol, ethoxylated castor oil, oleic acid ethoxylate, alkylphenol ethoxylates, copolymers of ethylene oxide (EO) and propylene oxide (PO) and copolymers of silicones and polyethers (silicone polyether copolymers), copolymers of silicones and copolymers of ethylene oxide and propylene oxide and mixtures thereof.

Optionally, the first and/or second part of the sealant composition can contain one or more additional ingredients, e.g., filler, UV stabilizer, antioxidant, adhesion promoter, cure accelerator, thixotropic agent, plasticizer, moisture scavenger, pigment, dye, surfactant, and solvent, the additional component being present in the first part and/or second part, whichever part(s) the component is compatible therewith. Thus, e.g., filler, where present, can be in the first and/or second part; U.V. stabilizer where present, will ordinarily be in the first part; antioxidant, where present will ordinarily be in the first part; adhesion promoter, where present, will be in the first part; cure accelerator, where present, will usually be in the second part; thixotropic agent, where present, will generally be included in the first part; plasticizer, where present, is in the first and/or second part; moisture scavenger, where present, will be in the first part; pigment, where present, can be in the first and/or second part; dye, where present, can be in the first and/or second part; surfactant, where present, can be in the first and/or second part; and, solvent, where present, can be in the first and/or second part.

In one embodiment, the sealant composition and the fumed silica compositions described herein can contain any of the above-described condensation catalysts. In the sealant composition the catalyst can be present in either the first part and/or the second part.

The sealant composition described herein can be combined in a manner wherein the first part and second part are present in a ratio of from about 8:1 to about 12:1, respectively, preferably in a ratio of from about 9:1 to about 11:1, respectively, and most preferably in a ratio of about 10:1, respectively.

In one embodiment, the sealant composition described herein is such that the silanol and/or hydrocarbon-terminated polyorganosiloxane (A) is present in an amount of from about 20 weight percent to about 50 weight percent; and the silylated polyurethane resin (B) is present in an amount of from about 5 to about 30 weight percent; said weight percents being based on the weight of the first part.

In another embodiment, the sealant composition described herein is such that the silanol and/or hydrocarbon-terminated polyorganosiloxane (A) is present in an amount of from about 25 weight percent to about 50 weight percent; and the silylated polyurethane resin (B) is present in an amount of from about 5 to about 25 weight percent; said weight percents being based on the weight of the first part.

In yet another embodiment, the sealant composition described herein is such that the silanol and/or hydrocarbon-terminated polyorganosiloxane (A) is present in an amount of from about 25 weight percent to about 50 weight percent; and the silylated polyurethane resin (B) is present in an amount of from about 8 to about 25 weight percent; said weight percents being based on the weight of the first part.

In still another embodiment, the sealant composition described herein is such that the silanol and/or hydrocarbon-terminated polyorganosiloxane (A) is present in an amount of from about 25 weight percent to about 50 weight percent; and the silylated polyurethane resin. (B) is present in an amount of from about 10 to about 15 weight percent, said weight percents being based on the weight of the first part.

In yet one other embodiment herein, the sealant composition described herein is such that the silanol and/or hydrocarbon-terminated polyorganosiloxane (A) is present in an amount of about 37 weight percent; and the silylated polyurethane resin (B) is present in an amount of about 12 weight percent, said weight percents being based on the weight of the first part.

In one further embodiment herein, the sealant composition described herein is such that the silanol and/or hydrocarbon-terminated polyorganosiloxane (A) is present in an amount of about 25 weight percent; and the silylated polyurethane resin (B) is present in an amount of about 25 weight percent, said weight percents being based on the weight of the first part.

As described herein in one most preferably embodiment, the sealant composition described herein is such that the silanol and/or hydrocarbon-terminated polyorganosiloxane (A) and the silylated polyurethane resin (B) are present in about equal amounts in the first part of the sealant composition.

In addition to the above ranges for component (A) in the sealant composition described herein, the amount of component (A) can have a lower end point of any of 15, 16, 18, 21, 22, 26, 27, 28, 30, 35, and 36, with any of an upper end point of 59, 58, 55, 49, and 48.

In addition to the above ranges for component (B) in the sealant composition described herein, the amount of component (B) can have a lower end point of 3, 4, 6, 7, 9, 11, and 15 with any of an upper end point of 31, 29, 28, 21 and 18.

In one embodiment herein, the fumed silica composition described herein further comprises at least one of plasticizer, catalyst and crosslinker and any one or more of the optional additional ingredients described above for the sealant composition.

In one embodiment herein, the fumed silica composition described herein is such that the silanol and/or hydrocarbon-terminated polyorganosiloxane (A) is present in an amount of from about 30 to about 54 weight percent, and the silylated polyurethane resin (B) is present in an amount of from about 15 to about 38 weight percent.

In another embodiment herein, the fumed silica composition described herein is such that the silanol and/or hydrocarbon-terminated polyorganosiloxane (A) is present in an amount of from about 30 to about 54 weight percent, and the silylated polyurethane resin (B) is present in an amount of from about 15 to about 38 weight percent.

In yet another embodiment herein, the fumed silica composition described herein is such that the silanol and/or hydrocarbon-terminated polyorganosiloxane (A) is present in an amount of from about 30 to about 42 weight percent, and the silylated polyurethane resin (B) is present in an amount of from about 15 to about 38 weight percent.

In one other embodiment herein, the fumed silica composition described herein is such that the silanol and/or hydrocarbon-terminated polyorganosiloxane (A) is present in an amount of about 30 weight percent, and the silylated polyurethane resin (B) is present in an amount of about 38 weight percent.

In addition to the above ranges for component (A) in the fumed silica composition described herein, the amount of component (A) can have a lower end point of any of 21, 22, 25, 28, 31, 32 and 33, with any of an upper end point of 61, 60, 58, 57, 53, 52, 48, 45, 41, 40 and 39.

In addition to the above ranges for component (B) in the fumed silica composition described herein, the amount of component (B) can have a lower end point of 9, 10, 13 and 14, with any of an upper end point of 37, 35, 30 and 25.

There is also provided herein a cured composition comprising any one of the composition, the sealant composition and the fumed silica composition described herein.

Any one of the cured. composition, the cured sealant composition and the cured fumed silica composition described herein have any one or more of improved tensile strength, elongation at break, 50% modulus, gas permeability properties, and water vapor transmission properties as compared to cured compositions having amounts of silanol and/or hydrocarbon-terminated polyorganosiloxane and/or SPUR outside the inventive amounts recited herein.

The present invention essentially involves the blending of different proportions of SPUR with moisture curable PDMS (silanol and/or hydrocarbon-terminated) to get a uniformly dispersed mixture, which possesses improved mechanical and barrier properties. Since, SPUR and PDMS are immiscible, the resultant composition appeared visually opaque, but with no phase separation until few months. The transmission electron microscopy (TEM) analysis of the moisture-cured blends is indicative of dispersion of one component (SPUR/PDMS) in the continuous matrix of another component (PDMS/SPUR) as dictated by weight fraction of each component. The composition and properties of different blends of PDMS and SPUR made in the present work are summarized in the below tables and graphs.

EXAMPLES

Silanol-Terminated Polydimethylsiloxane (PDMS)-SPUR Blends—Formulation Details

The weight percent of SPUR in PDMS in Table 1 is the weight percent of SPUR based on the combined weight of SPUR and PDMS alone.

Ingredients were mixed in Hauchild speedmixer and the formulation was cured in a Teflon mould under ambient conditions for 7 days Silanol-1 is hydroxyl-terminated PDMS of viscosity 3,000 cps and Silanol 2 is hydroxyl-terminated PDMS of viscosity 30,000 cps procured from Gelest, USA. SPUR 1015 is a silylated polyurethane resin available from Momentive Performance Materials Inc. and DBTO is dibutyl tin oxide.

TABLE 1

Typical procedure of making moisture curable PDMS composition (Comparative Example-1)

| Formulations | SPUR 1015 (g) | Silanol 1 (g) | Silanol 2 (g) | n-propylsilicate (ml) | DBTO (microlitre) |
|---|---|---|---|---|---|
| PDMS control-Comparative Example 1 | 0 | 50 | 50 | 2 | 100 |
| 2.5 wt % SPUR in PDMS-Working Example 1 | 2.5 | 48.75 | 48.75 | 2 | 100 |
| 10 wt % SPUR in PDMS-Working Example 2 | 10 | 45 | 45 | 2 | 100 |
| 20 wt % SPUR in PDMS-Working Example 3 | 20 | 40 | 40 | 2 | 100 |
| 30 wt % SPUR in PDMS-Working Example 4 | 30 | 30 | 30 | 2 | 100 |
| 50 wt % SPUR in PDMS-Working Example 5 | 50 | 25 | 25 | 2 | 100 |
| 60 wt % SPUR in PDMS Working Example 6 | 60 | 20 | 20 | 2 | 100 |
| 70 wt % SPUR in PDMS Working Example 7 | 70 | 15 | 15 | 2 | 100 |
| 90 wt % SPUR in PDMS Working Example 8 | 90 | 5 | 5 | 2 | 100 |
| SPUR 1015-Comparative Example 2 | 100 | 0 | 0 | 2 | 100 |

50 g of silanol terminated polydimethylsiloxane (silanol-1) of viscosity 3000 cst and 50 g of silanol terminated polydimethylsiloxane of viscosity (silanol-2) 30000 cst were mixed in Hauchild speed mixer for 1 minute along with 2 milliliters (ml) of n-propyl silicate cross-linker and 100 microliters (μL) of dibutyl tin oxide catalyst. After mixing, the formulation was poured in a Teflon mould of 2 mm thickness and allowed to cure for 7 days under ambient conditions.

Procedure of Making Moisture Curable PDMS-SPUR Blend Compositions

Working Examples—1-5

Working Example-1

2.5 g of silylated polyurethane resin was mixed with 48.75 g of silanol-1 and 48.75 g of silanol-2 in a Hauchild speed mixer for 1 minute along with 2 ml of n-propyl silicate and 100 μl. of dibutyl tin oxide.

Working Example-2

The same procedure described for working example-1 was followed, except the use of 10 g, instead of 2.5 g of SPUR, with the amount of silanol-1 and silanol-2 being adjusted downwards and being split equally into 45 g of silanol-1 and 45 g of silanol-2.

Working Example-3

The same procedure described for working example-1 was followed, except the use of 20 g, instead of 2.5 g of SPUR, with the amount of silanol-1 and silanol-2 being adjusted downwards and being split equally into 40 g of silanol-1 and 40 g of silanol-2.

Working Example-4

The same procedure described for working example-1 was followed, except the use of 30 g, instead of 2.5 g of SPUR, with the amount of silanol-1 and silanol-2 being adjusted downwards and being split equally into 35 g of silanol-1 and 35 g of silanol-2.

Working Example-5

The same procedure described for working example-1 was followed, except the use of 50 g, instead of 2.5 g of SPUR, with the amount of silanol-1 and silanol-2 being adjusted downwards and being split equally into 25 g of silanol-1 and 25 g of silanol-2.

Working Example-6

The same procedure described for working example-1 was followed, except the use of 60 g, instead of 2.5 g of SPUR, with the amount of silanol-1 and silanol-2 being adjusted downwards and being split equally into 20 g of silanol-1 and 20 g of silanol-2.

Working Example-7

The same procedure described for working example-1 was followed, except the use of 70 g, instead of 2.5 g of SPUR, with the amount of silanol-1 and silanol-2 being adjusted downwards and being split equally into 15 g of silanol-1 and 15 g of silanol-2.

Working Example-8

The same procedure described for working example-1 was followed, except the use of 90 g, instead of 2.5 g of SPUR, with the amount of silanol-1 and silanol-2 being adjusted downwards and being split equally into 5 g of silanol-1 and 5 g of silanol-2.

Typical Procedure of Making Moisture Curable
SPUR Composition (Comparative Example-2)

100 g of silylated polymer (SPUR 1015) was taken in a speed mixer and mixed with 2 ml of n-propyl silicate and 100 µL of dibutyl tinoxide. The mixture was then poured in a Teflon mould of 2 mm thickness and allowed to cure for 7 days under ambient conditions.

Typical Procedure of Gas Permeability Measurements

Samples of circular disks with a diameter of 5 cm were cut from the cured sheets of PDMS-SPUR blends and used for oxygen permeability measurements. Oxygen permeability was measured using Mocon Oxtran equipment and the values were reported in barrers.

Typical Procedure of Mechanical Property Measurements

The test specimens were cut from the cured sheets of PDMS-SPUR blends for measuring tensile properties using Instron tensile testing machine, according to ASTM method D-412-87. An average of 5 measurements are reported for each tensile measurement.

Mechanical Properties of SPUR-PDMS Blends:

The mechanical properties of moisture-cured sheets of PDMS containing different loadings of SPUR are summarized in Table 2 below. For the purpose of comparison, the mechanical properties of moisture-cured sheets of neat PDMS and neat SPUR are provided. As shown in Table 2, the mechanical properties of moisture-cured PDMS are mostly retained or improved significantly, with the addition of SPUR. While, the neat moisture cured PDMS sheet does not possess any strength (which can be measured with the instrument set-up used in the present work) when stretched under load, the addition of just 2.5 wt % of SPUR is found to make the PDMS significantly stiffer, without adversely affecting elongation, as is evidenced by the difference in modulus. Especially, the blend containing 50% PDMS and 50% SPUR is found to possess improved mechanicals (tensile strength, Elongation at break and tensile modulus), in comparison to both neat PDMS and neat SPUR.

Figure 2:
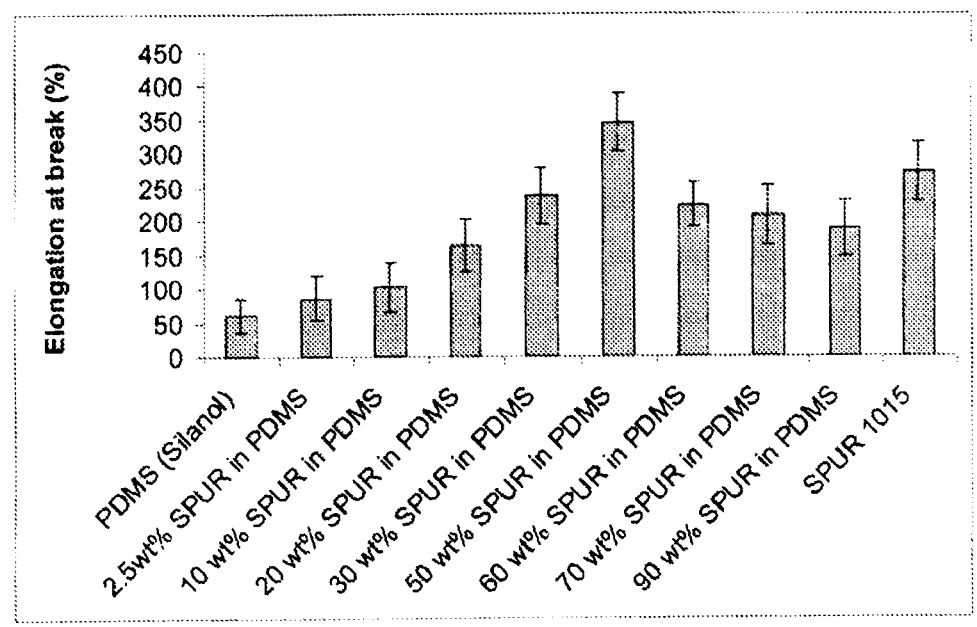
Figure 3:
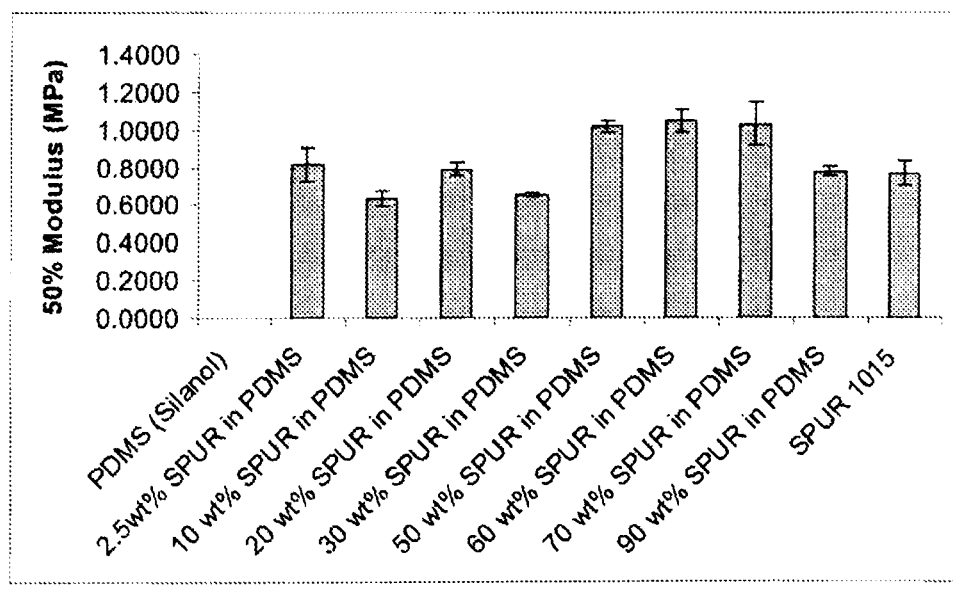

Mechanical properties are also illustrated in FIGS. 1-3, comporting with data in Table 2. In particular, FIG. 1 shows the tensile strength, FIG. 2 shows the elongation at break and FIG. 3 shows modulus.

Gas Permeability Properties of SPUR-PDMS Blends:

The oxygen permeability data obtained for moisture-cured sheets of PDMS containing different loading of SPUR are summarized in the table below. For the purpose of comparison, the oxygen permeability data for moisture-cured sheets of neat PDMS and neat SPUR are provided. As shown in the table, the oxygen permeability of PDMS is found to decrease with addition of 10 wt % or more of SPUR.

TABLE 3

| Examples | Formulations | O2 permeability in barrer |
|---|---|---|
| Comparative Example 1 | PDMS control | 1199.29 |
| Working example 1 | 2.5 wt % SPUR in silanol | 1326.56 |
| Working example 2 | 10 wt % SPUR in silanol | 1160.13 |
| Working example 4 | 30 wt % SPUR in silanol | 707.00 |
| Working example 5 | 50 wt % SPUR in silanol | 623.25 |
| Comparative Example 2 | SPUR control | 63.86 |

Though the present results pertained to oxygen permeability characteristics of neat PDMS-SPUR blends, given the known correlation, the observed trend could be extended to argon permeability of the sealant compositions derived from these blends.

Figure 4:
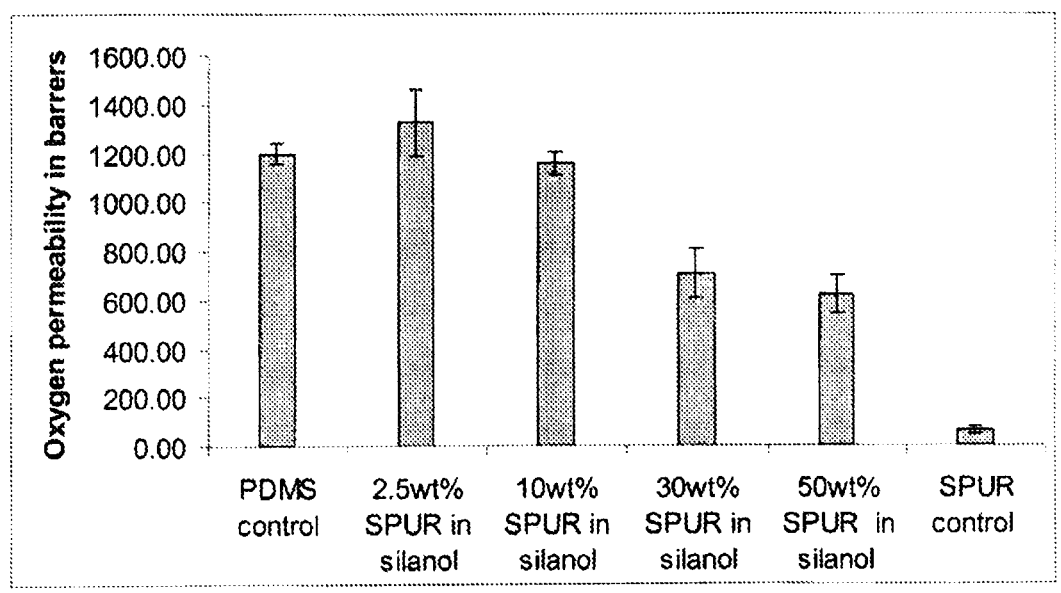

Oxygen permeability data shown in Table 3 are also illustrated in FIG. 4.

Oxygen permeability of SPUR is 20 times lower than PDMS. 50% decrease in permeability in PDMS with 30% SPUR 1015

Figure 5:
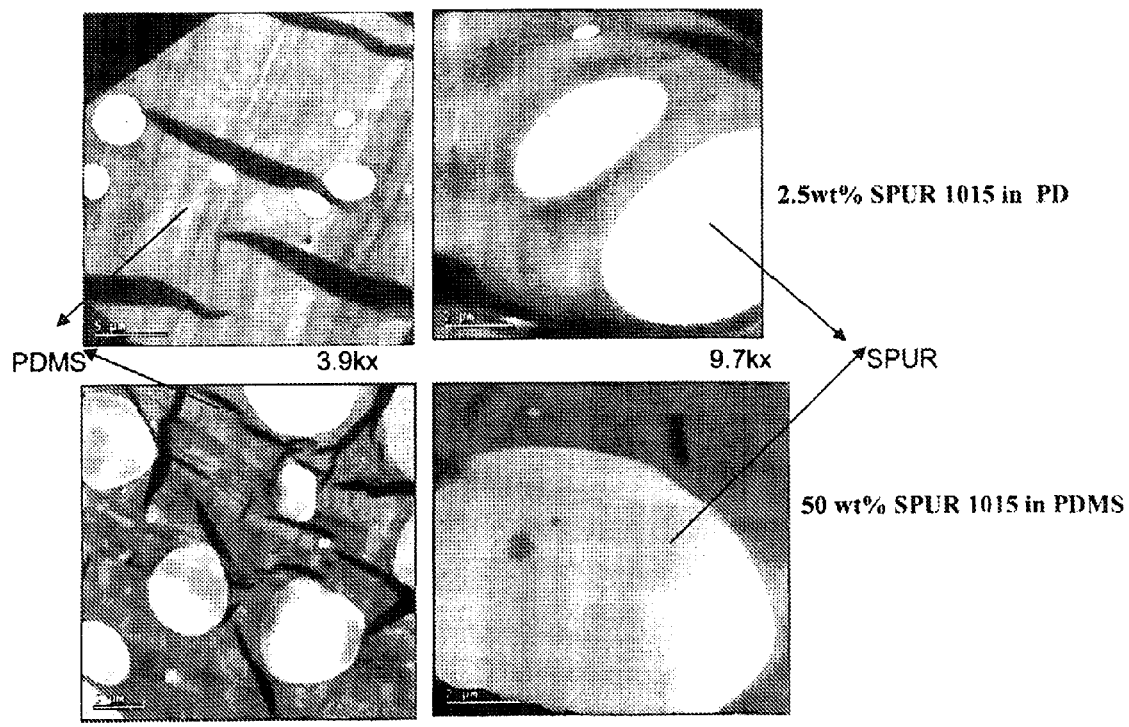

Morphology of PDMS-SPUR blends are shown in FIG. 5.

Morphology of PDMS-SPUR Blends

PDMS continuous phase even with 50% SPUR loading, domain size of SPUR increases with concentration as expected.

Figure 6:
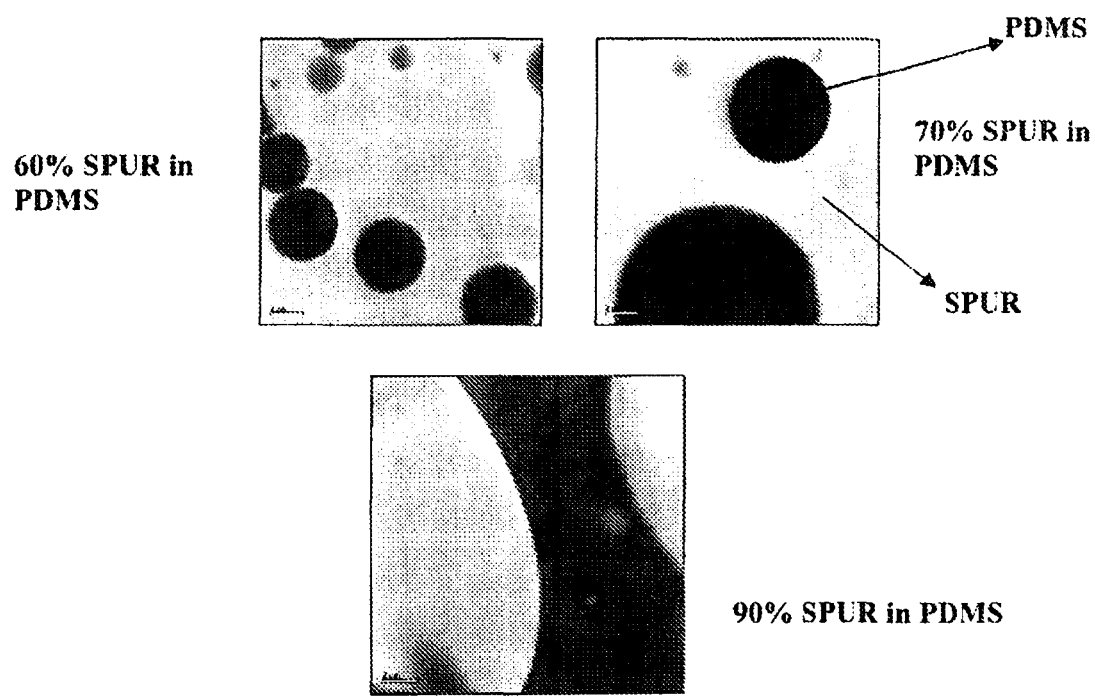

Morphology of PDMS-SPUR blends at higher loading of SPUR are shown in FIG. 6.

SPUR-continuous phase and PDMS-domain phase at higher load of SPUR; Phase reversion happens at about 60% SPUR concentration.

TABLE 2

| Examples | Formulations | Tensile strength (MPa) | Std dev | Elongation to break (%) | Std. dev | 50% modulus (MPs) | Std dev |
|---|---|---|---|---|---|---|---|
| Comparative Example 1 | PDMS (Silanol) | 0.7923 | 0.0799 | 61.37 | 25 | 0.0000 | |
| Working example 1 | 2.5 wt % SPUR in PDMS | 0.601 | 0.0552 | 86.17 | 33.15 | 0.8174 | 0.0924 |
| Working example 2 | 10 wt % SPUR in PDMS | 0.7277 | 0.0598 | 102 | 37.18 | 0.6329 | 0.0378 |
| Working example 3 | 20 wt % SPUR in PDMS | 0.968 | 0.098 | 163.9 | 40 | 0.7896 | 0.0349 |
| Working example 4 | 30 wt % SPUR in PDMS | 0.9923 | 0.0682 | 237.9 | 41.6 | 0.6537 | 0.0106 |
| Working example 5 | 50 wt % SPUR in PDMS | 1.318 | 0.139 | 345.7 | 43 | 1.0140 | 0.031 |
| Comparative Example 2 | SPUR 1015 | 0.9038 | 0.1037 | 271.3 | 45 | 0.7705 | 0.0615 |

TABLE 4

PDMS-SPUR Blends-Full sealant Formulation

| | Part A | | | | | |
|---|---|---|---|---|---|---|
| CHEMICAL NAME | Comparative Example-1 100% silicone | Working Example-2 2.5 wt % SPUR | Working Example-3 5 wt % SPUR | Working Example-4 12.5 wt % SPUR | Working Example-5 25 wt % SPUR | Comparative Example-2 100% SPUR |
| | | | Weight % | | | |
| SPUR 1015 | 0 | 2.50 | 5 | 12.5 | 25 | 50 |
| DIMETHYL POLYMER (3,000 cps) | 25.0 | 23.75 | 22.5 | 18.75 | 12.5 | 0 |
| DIMETHYLSILICONE OIL (30,000 cps) | 25.0 | 23.75 | 22.5 | 18.75 | 12.5 | 0 |
| (precipitated) CALCIUM CARBONATE (Hakuenka TDD) | 25.0 | 25.00 | 25.0 | 25 | 25 | 25 |
| (ground) CALCIUM CARBONATE (Omya FT) | 25.0 | 25.00 | 25.0 | 25 | 25 | 25 |
| Total | 100.0 | 100 | 100 | 100 | 100 | 100 |

TABLE 5

| Part B preparation | IGS3723B |
|---|---|
| DIMETHYLPOLYSILOXANE (Viscasil 10M -10,000 cps) | 63.3 |
| CARBON BLACK (Printex 35) | 8.0 |
| AMINOPROPYLTRIETHOXYSILANE | 15.0 |
| N-PROPYLSILICATE | 13.0 |
| SOLUBILIZED DIBUTYL TIN OXIDE | 0.7 |
| | 100.0 |

Part A and Part B are mixed in 10:1 ratio in speed mixer.

Figure 7:
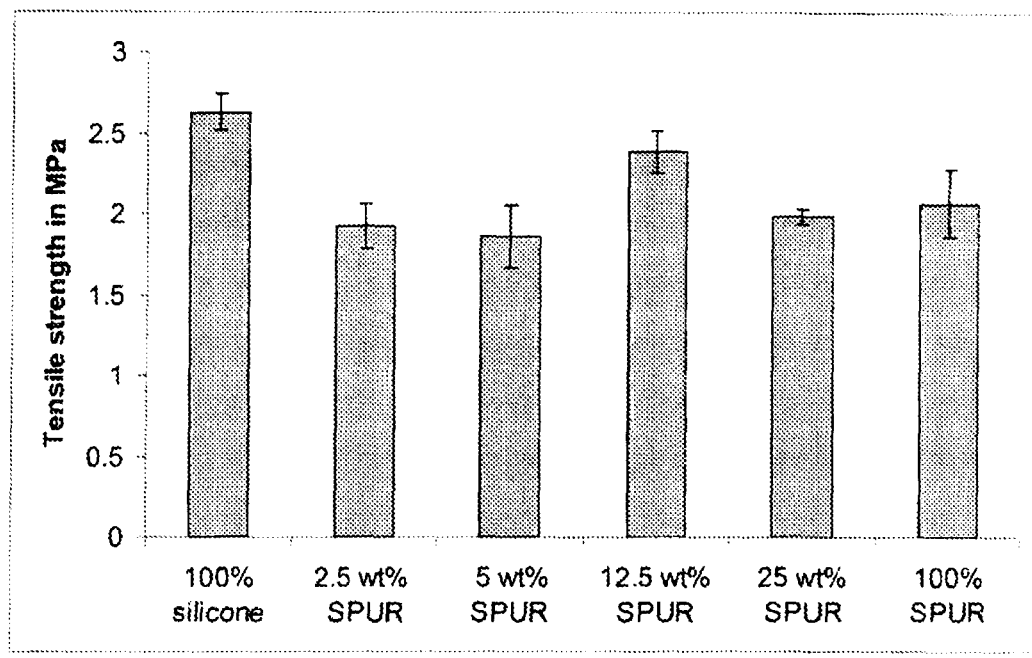
Figure 8:
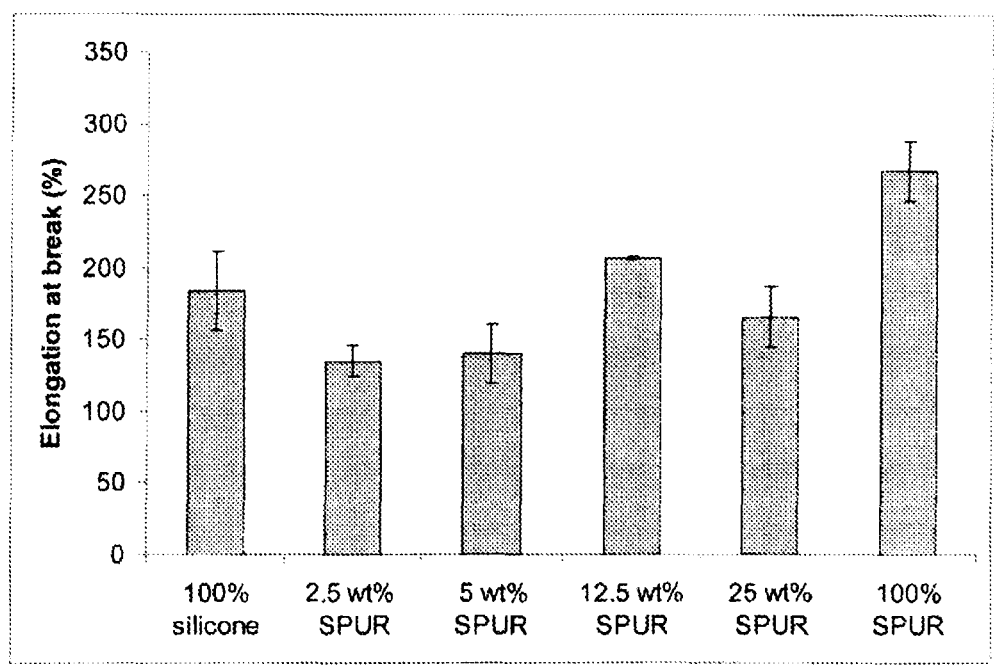
Figure 9:
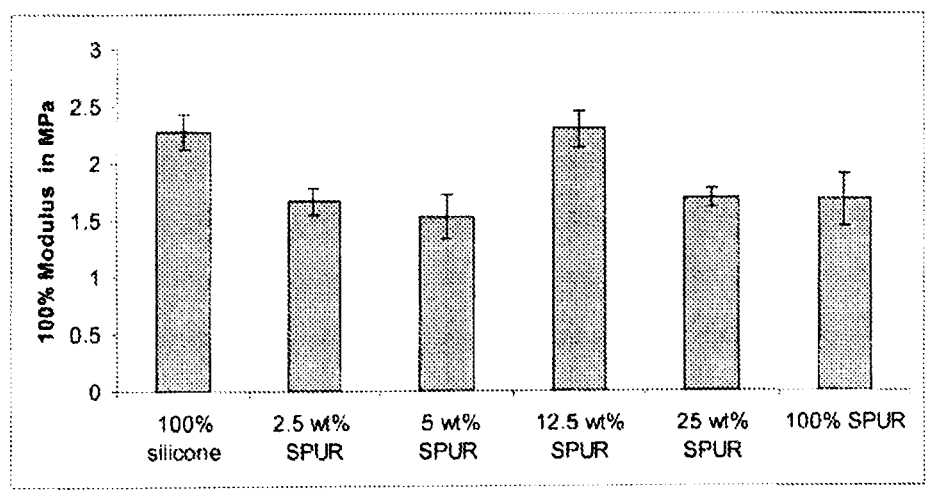

Mechanical properties are also illustrated in FIGS. 7-9, comporting with data in Tables 4 and 5. In particular, FIG. 7 shows the tensile strength, FIG. 8 shows the elongation at break and FIG. 9 shows modulus.

Cure and mechanical properties of SPUR containing formulations are similar to PDMS only silicone sealants.

Figure 10:
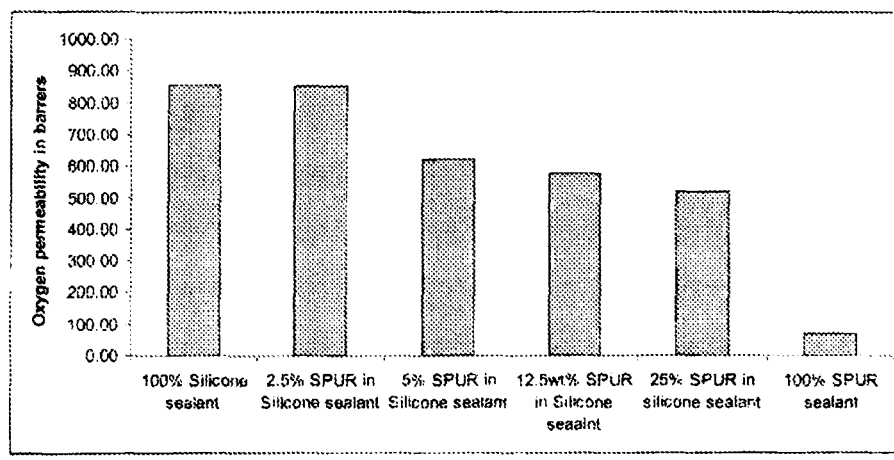

Oxygen permeability data of full sealant formulation shown in Tables 4 and 5 are also illustrated in FIG. 10.

The second table of Oxygen permeability sent with the data is missing.

Figure 11:
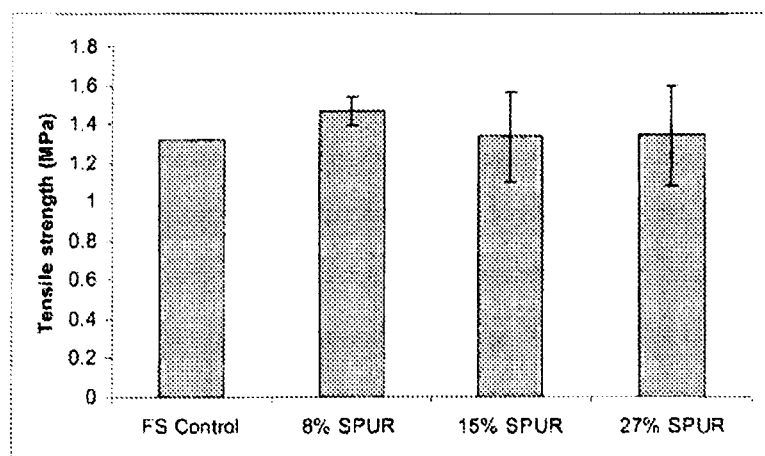
Figure 12:
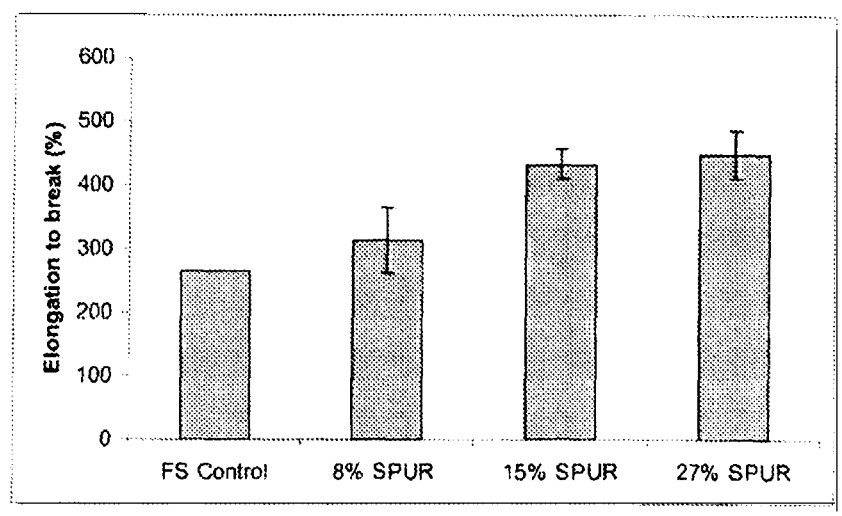
Figure 13:
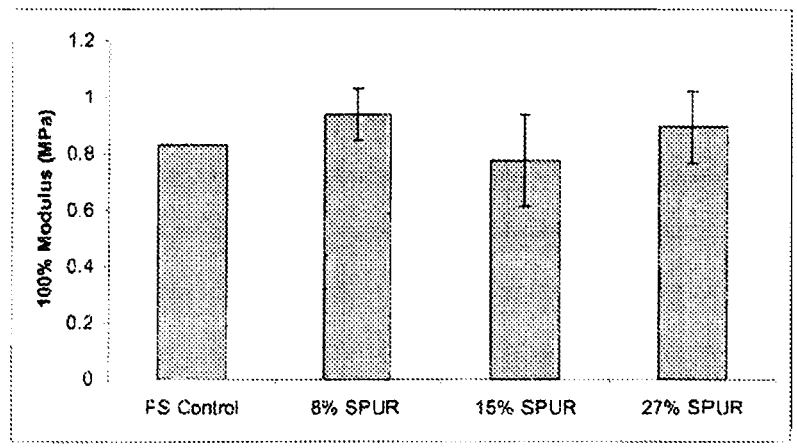

There is a 25-40% reduction in oxygen permeability with 5-25 weight percent SPUR loading in full sealant formulation 6. In particular, FIG. 11 shows the tensile strength, FIG. 12 shows the elongation at break and FIG. 13 shows modulus.

Similar Tensile strength and modulus as compared to control with little improved elongation to break at higher loading of SPUR.

Figure 14:
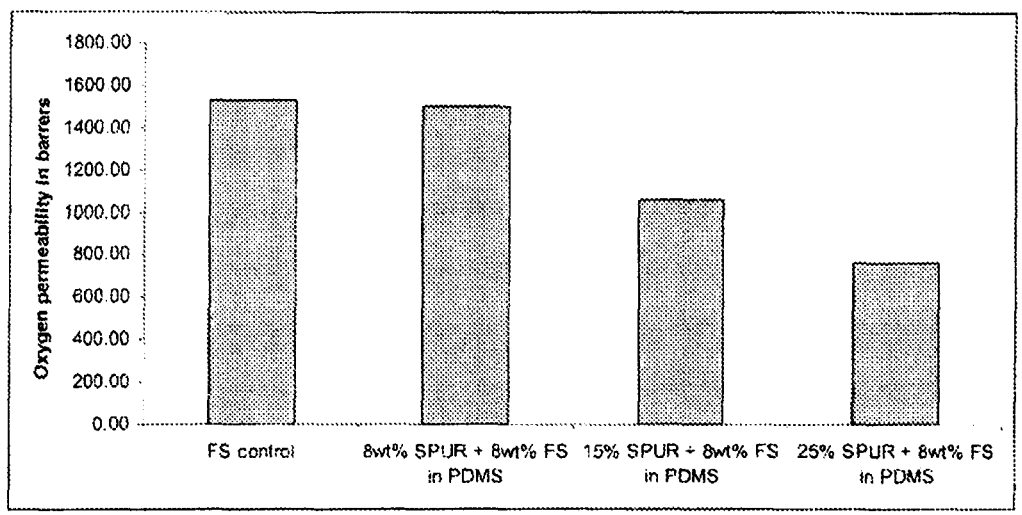

Oxygen permeability data of fumed silica formulation shown in Table 6 are also illustrated in FIG. 14.

30-50% reduction in oxygen permeability with 15-25 wt % SPUR loading in fumed silica formulation.

Figure 15:
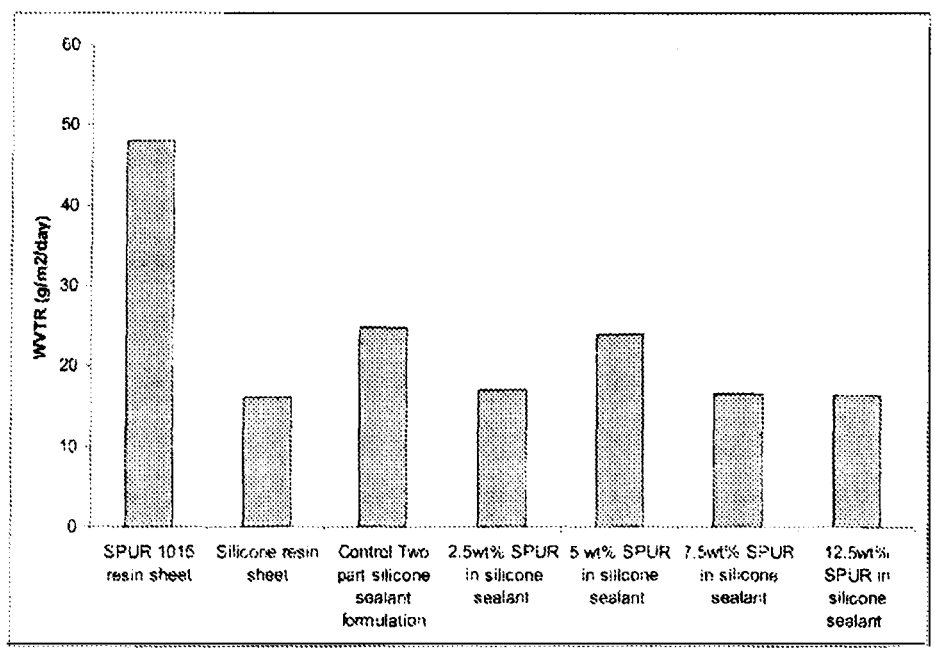

Water vapor transmission data of the PDMS-SPUR blends is shown in FIG. 15.

Water vapor transmission (WVTR) studies carried out using MOCON WVTR/MG 3/33 Test Conditions-25 Degrees C and 50% RH WVTR of neat SPUR resin is 3 times higher than silicone resin.

Addition of up to 12.5 wt % SPUR in silicone sealant formulation does not significantly affect the WVTR characteristics of silicone sealant.

Figure 16:
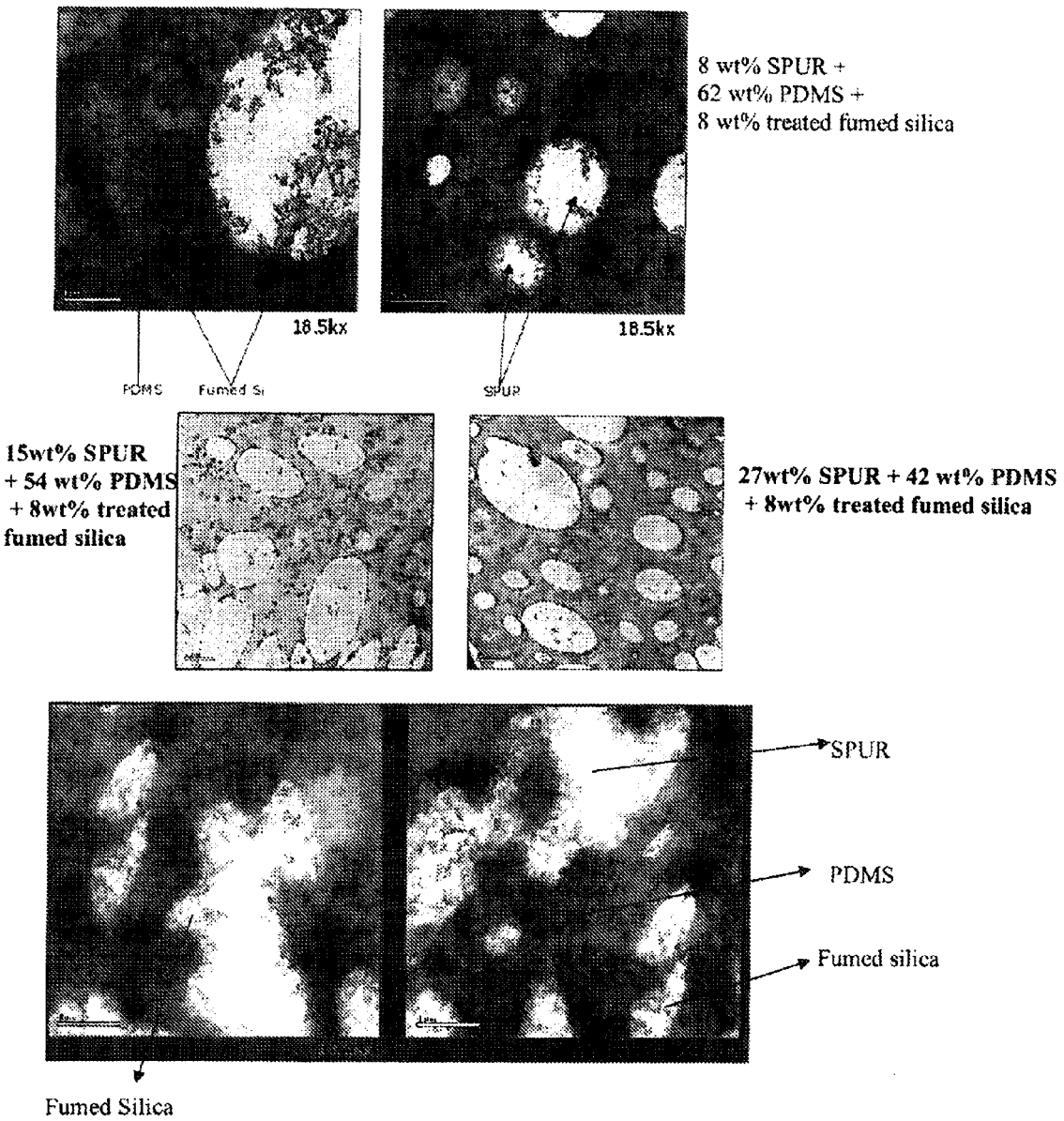

Morphology of the fumed silica compositions are shown in FIG. 16.

SPUR remains in domain phase when loading is from 8-27 wt % in fumed silica compositions

TABLE 6

Fumed Silica Composition

| Ingredients | Comparative example-1 FS Control | Working example-1 8% SPUR | Working example-2 15% SPUR | Working example-3 27% SPUR | Working example-4 38% SPUR | Working example-5 | Working example-6 |
|---|---|---|---|---|---|---|---|
| Silanol (3000 cps) | 35 | 31 | 27 | 21 | 15 | 31 | 15 |
| Silanol (30000 cps) | 35 | 31 | 27 | 21 | 15 | 31 | 15 |
| SPUR 1015 | 0 | 8 | 15 | 27 | 38 | 8 | 38 |
| Fumed silica (treated) | 8 | 8 | 8 | 8 | 8 | 0 | 0 |
| Viscazil Plasticizer | 23 | 23 | 23 | 23 | 23 | 23 | 23 |
| Untreated Fumed silica | 0 | 0 | 0 | 0 | 0 | 8 | 8 |

Untreated silica compositions did not cure as expected.

Treated silica compositions cured after 24 hours.

Run 4-viscosity was very high and was very difficult to spread on the mould.

Mechanical properties of the fumed silica compositions are also illustrated in FIGS. 11-13. comporting with data in Table 38 wt % SPUR+30 wt % PDMS+8 wt % treated fumed silica Co-continuous phase formation at higher loading of SPUR (38 wt %) in fumed silica formulation.

While the process of the invention has been described with reference to certain embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out the process of the invention but that the invention will include all embodiments falling within the scope of the appended claims.

The invention claimed is:

1. A composition comprising:
   (A) a silanol or an alkoxy-terminated and end-capped polyorganosiloxane in an amount of from 4 weight percent to 40 weight percent, wherein radicals bonded to Si atoms of the polyorganosiloxane are selected from the group consisting of —O—, —OH and monovalent; and,
   (B) a moisture curable silylated polyurethane resin in an amount of from at least 60 weight percent to about 90 weight percent, wherein said composition is opaque, and wherein the moisture curable silylated polyurethane resin (B) is a continuous phase and the silanol or alkoxy terminated polyorganosiloxane (A) is a domain phase.

2. The composition of claim 1 wherein the composition when cured possesses a 50% modulus of from about 0.77 MPa to about 1.01 MPa and a tensile strength of from about 0.96 MPa to about 1.2 MPa.

3. The composition of claim 1 wherein the composition when cured possesses an elongation to break of from about 180% to about 225% and an $O_2$ permeability of no more than about 623 barrer.

4. The composition of claim 1 wherein the silanol or alkoxy-terminated polyorganosiloxane (A) is a polydiorganosiloxane.

5. The composition of claim 1 wherein the silanol or alkoxy-terminated polyorganosiloxane (A) is a polydiorganosiloxane wherein the organo moieties are each independently an alkyl group of from 1 to about 6 carbon atoms or a phenyl group of from 6 to about 14 carbon atoms.

6. The composition of claim 1 wherein the moisture curable silylated polyurethane resin is obtained by a reaction of an isocyanate-terminated polyurethane prepolymer with a silane.

7. The composition of claim 1 wherein the moisture curable silylated polyurethane resin is obtained by a reaction of a hydroxyl-terminated polyurethane prepolymer with an isocyanate-terminated silane.

8. A two part sealant composition wherein the first part comprises:
   (A) a silanol or an alkoxy-terminated and end-capped polyorganosiloxane in an amount of from 4 weight percent to no more than 40 weight percent, wherein radicals bonded to Si atoms of the polyorganosiloxane are selected from the group consisting of —O—, —OH and monovalent hydrocarbon without a heteroatom; and,
   (B) a moisture curable silylated polyurethane resin in an amount of from at least 60 weight percent to about 90 weight percent, and
   (C) a filler, said weight percents being based on the weight of the first part, wherein said composition is opaque, and wherein the moisture curable silylated polyurethane resin (B) is a continuous phase and the silanol or alkoxy terminated polyorganosiloxane (A) is a domain phase.

9. The two part sealant composition of claim 8 wherein the second part comprises:
   (D) an alkyl-terminated polysiloxane;
   (E) a catalyst;
   (F) an adhesion promoter;
   (G) a crosslinker; and, optionally,
   (H) at least one additional component selected from the group consisting of at least one solid polymer having a permeability to gas that is less than the permeability of the crosslinked polyorganosiloxane, UV stabilizer, antioxidant, cure accelerator, thixotropic agent, plasticizer, moisture scavenger, pigment, dye, surfactant, and solvent.

10. The two part sealant composition of claim 8 wherein the first part and second part are present in a ratio of from about 8:1 to about 12:1, respectively.

11. The composition of claim 8 wherein the moisture curable silylated polyurethane resin is obtained by a reaction of an isocyanate-terminated polyurethane prepolymer with a silane.

12. The composition of claim 8 wherein the moisture curable silylated polyurethane resin is obtained by a reaction of a hydroxyl-terminated polyurethane prepolymer with an isocyanate-terminated silane.

13. A fumed silica composition comprising:
   (A) a silanol or an alkoxy-terminated and end-capped polyorganosiloxane in an amount of from 4 weight percent to no more than 40 weight percent, wherein radicals bonded to Si atoms of the polyorganosiloxane are selected from the group consisting of —O—, —OH and monovalent hydrocarbon without a heteroatom; and,
   (B) a moisture curable silylated polyurethane resin in an amount of from at least 60 weight percent to about 90 weight percent, and
   (C) a treated fumed silica in an amount of from about 5 to about 10 weight percent, wherein said composition is opaque, and wherein the moisture curable silylated polyurethane resin (B) is a continuous phase and the silanol or alkoxy terminated polyorganosiloxane (A) is a domain phase.

14. The fumed silica composition of claim 13 further comprising at least one of plasticizer, catalyst and crosslinker.

15. A cured composition comprising the composition of claim 1.

16. A cured composition comprising the sealant composition of claim 8.

17. A cured composition comprising the fumed silica composition of claim 13.

* * * * *